United States Patent [19]
Chang et al.

[11] Patent Number: 5,619,489
[45] Date of Patent: Apr. 8, 1997

[54] HAND-HELD TELECOMMUNICATION TESTER

[75] Inventors: Paul K. Chang, San Jose; Paul A. Marshall, Morgan Hill; Robert C. Pfeiffer, San Jose, all of Calif.

[73] Assignee: Sunrise Telecom, Inc., San Jose, Calif.

[21] Appl. No.: 504,949

[22] Filed: Jul. 20, 1995

[51] Int. Cl.$^6$ .............................. H04J 3/14; H04M 1/24
[52] U.S. Cl. ............................ 370/241; 379/21; 370/254
[58] Field of Search .............................. 379/21, 136, 22; 370/13, 14, 15

[56] References Cited

FOREIGN PATENT DOCUMENTS

WO89/07377  9/1989  WIPO ........................ H04M 15/26

Primary Examiner—Douglas W. Olms
Assistant Examiner—Matthew C. Phillips
Attorney, Agent, or Firm—Townsend and Townsend and Crew LLP

[57] ABSTRACT

A graphically configurable method and device for testing high-frequency (DS0, DS1, DS3, and SONET) communication networks is disclosed. The foregoing is accomplished by a microprocessor controlled test instrument configured through a graphical interface which selects signal paths and test parameters. The graphical interface intelligently presents the choices of paths and test parameters relevant for the current test configuration.

20 Claims, 8 Drawing Sheets

FIG. 4D

HAND-HELD TELECOMMUNICATION TESTER

BACKGROUND OF THE INVENTION

The present invention relates to test instrumentation generally and more specifically to instrumentation for testing digital communication networks.

Digital communication networks utilize increasingly higher frequency channels multiplexed onto increasingly higher frequency carriers, including optical carriers. Most consumers do not need the entire bandwidth of a high frequency channel. A high frequency channel may be time multiplexed to contain many lower frequency channels, each lower frequency channel providing service to a consumer. Before a lower frequency channel may be tested, it is generally received and demultiplexed from the high frequency channel. The lower frequency channel may then be tested in a variety of ways, involving various terminations and signal paths. Channel terminations may include terminating the channel in a characteristic impedance, passing the channel through to its destination, looping the channel onto another channel of the same characteristic, or multiplexing the channel onto a carrier.

The net result is that telecommunication test instruments manipulate potentially several hundred low frequency channels through several possible test paths, and apply several different test conditions. Test instruments capable of testing high frequency digital communication channels, especially electrical test ports of optical fibers such as an STS-1 channel, are typically bench-top units. The size, weight and power consumption of these units nearly prohibits testing STS-1 channels in the field.

Testing of lower frequency transmission services on higher frequency transmission networks can become very complicated if the testing configurations have to be made manually. A menu driven test system, currently available in prior art bench-top and hand-held units, may simplify test setup by configuring a device to a selected condition. Although a graphical presentation of the final test configuration may clarify which test configuration has been chosen, a long menu-driven setup process can still lead to incorrect test configurations and invalid test results.

Additionally, menu-driven test systems typically require a user to remember several mnemonics, or alternatively, to read the menu commands off of a separate, printed index key. A forgotten command or index key may result in inability to perform the desired test.

SUMMARY OF THE INVENTION

The present invention provides methods and devices for testing high-frequency communication networks using a graphical display that allows the operator to graphically edit the test signal path and test port. The graphical interface incorporates built-in intelligence and provides the user with the proper choices of paths and test signals depending on the location of a graphical pointer. The test system configuration is graphically displayed as the operator chooses the desired set-up. This minimizes the chance of incorrect test results arising from erroneous test system configuration because the operator constantly views the current configuration of the test system and is prompted to choose only those operations that are relevant to the current test system configuration and pointer location.

The invention is superior to existing communication test methods and instruments because it provides a faster, less error prone way to configure communication network test systems. Another advantage of the present invention is the use of innovative packaging and high density gate arrays which allows testing of communication channels up to 51 Mbps (equivalent to 51 Mhz) in an integrated, battery-powered, hand-held unit. This advantage allows tests of STS-1 or DS3 channels to be made nearly anywhere, and without the requirements of an electrical outlet or test bench.

In one embodiment, a device for testing communication transmission networks comprises:

at least one signal input port;

test circuitry which receive signals from the signal input port;

a multiplexer which routes the signals to the test circuitry;

a microprocessor that controls operation of the multiplexer and test circuitry;

a user input device for inputting operating instructions to the microprocessor, the operating instructions including a configuration of a communication transmission network; and a graphical display showing the configuration as the configuration is being input;

wherein graphical editing of the configuration of the communication transmission network is achieved.

A further understanding of the nature and advantages of the invention may be realized by reference to the remaining portions of the specification and the drawings.

DESCRIPTION OF THE PREFERRED EMBODIMENT

Figure 1:
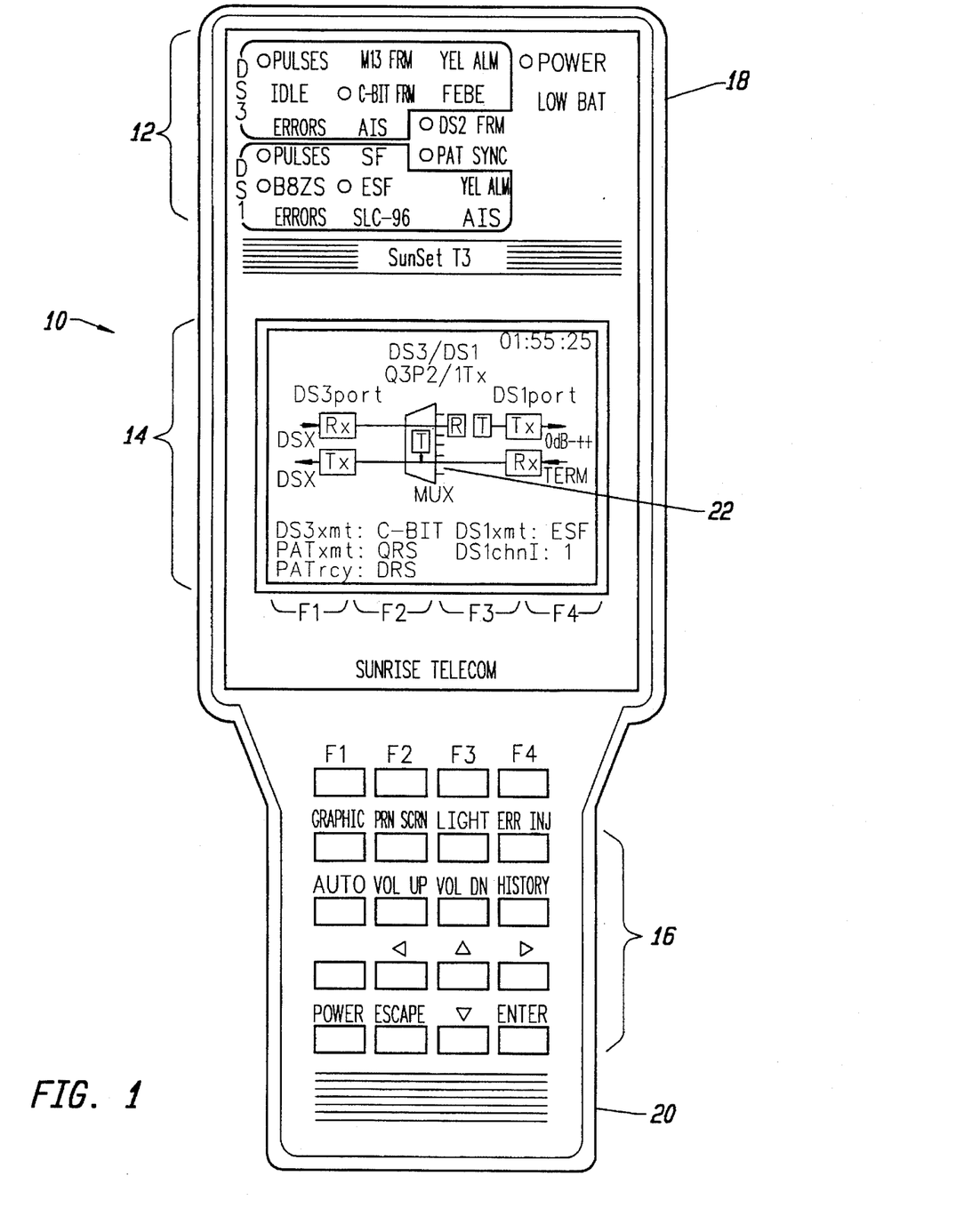
FIG. 1 shows an embodiment of the invention with display and keypad for user input.

An embodiment of the present invention is shown in FIG. 1. As depicted, a hand-held telecommunications tester (tester) 10, includes LEDs 12, an LCD graphical display 14, a keypad 16, a speaker 18, a microphone 20, and a graphical pointer 22. LEDs 12 indicate certain conditions of the DS1 and DS3 digital communication lines, which connect to the device through jacks on the side of the device (not shown). LCD graphical display 14 displays the test configuration, certain test results, the softkey functions, and the location of the graphical pointer 22, which is indicated by inverse video. Keypad 16 allows a user to select certain test conditions, to control the test device, to move the graphical pointer of the graphical editor, and to dial a phone number. In some embodiments, tester 10 weighs less than 5 pounds. In a preferred embodiment, the tester weighs approximately 2.8 pounds.

Figure 2A:
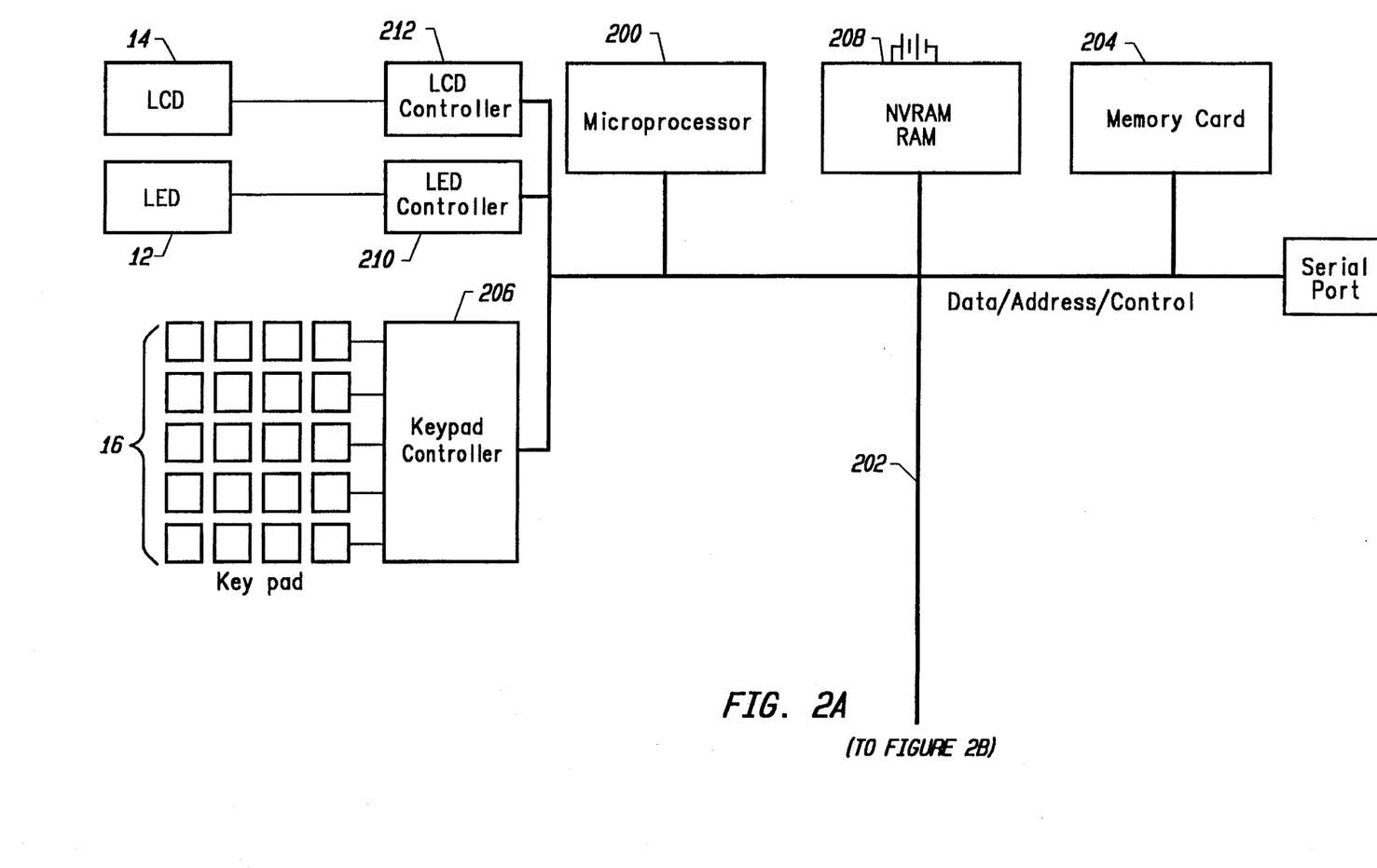
FIGS. 2A and 2B are a block diagram of the hand-held telecommunications tester.
Figure 2B:
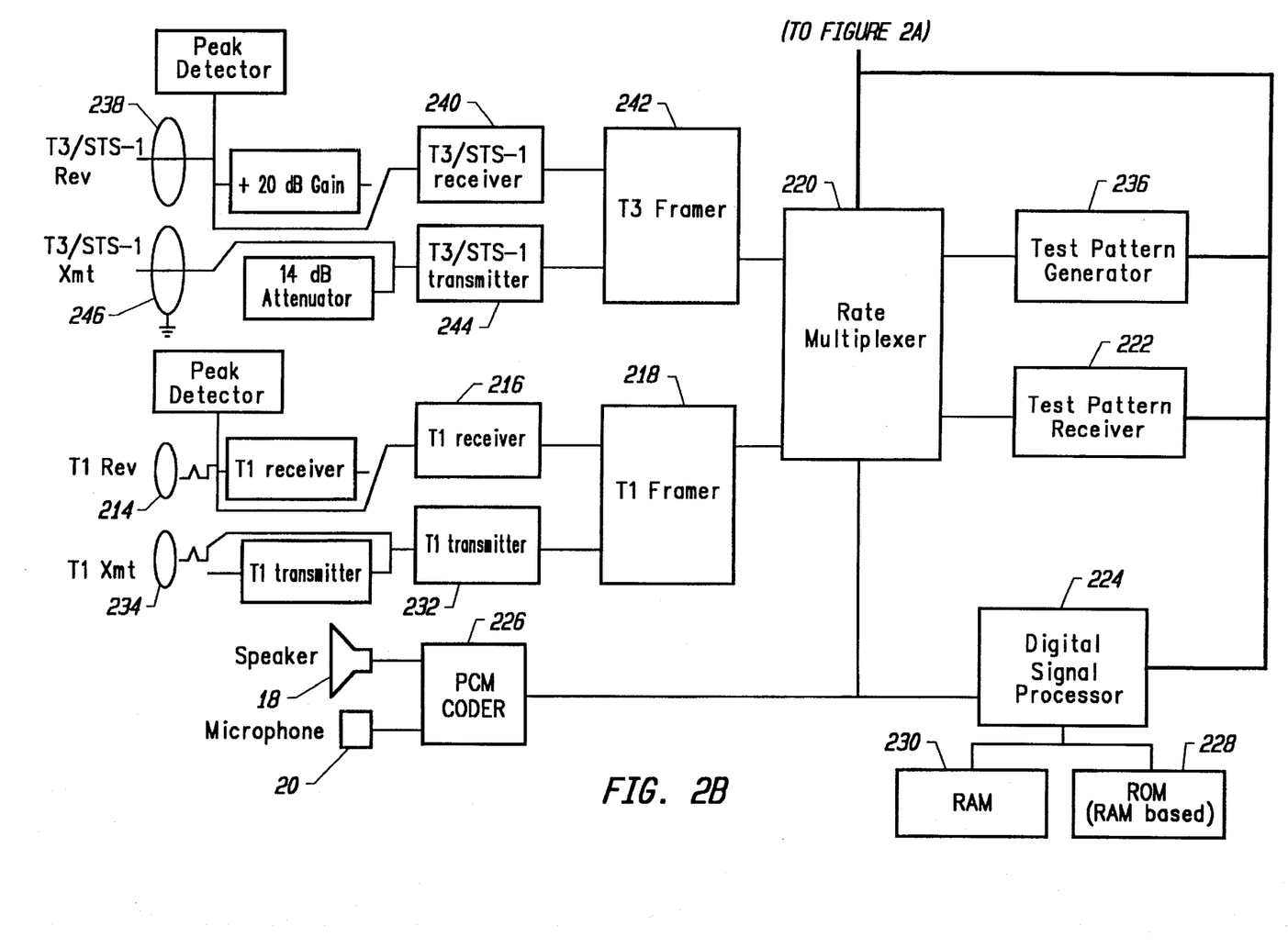

FIGS. 2A and 2B show a block diagram of an embodiment of the present invention. A microprocessor 200 controls the operation of the device via a Data/Address/Control bus 202 according to stored program instructions in a memory card 204 and user input from keypad 16. A keypad controller 206 receives input from keypad 16 and translates this input into input for microprocessor 200. Device status, test configuration and test results are stored in a non-volatile RAM (NVRAM) 208, which may be displayed on LCD graphic display 14. LED display 12 displays current device status and test results. An LED display controller 210 interprets the display commands from the microprocessor to provide outputs which drive the LED display 12. An LCD display controller 212 interprets the display commands from the microprocessor to provide outputs which drive LCD graphical display 14.

Tester 10 receives a DS1 signal, or line code, at a T1 receiver port 214. A DS1 communication line operates at nominally 1.544 Mbps and may contain up to 24 DS0 channels, each DS0 channel representing an individual voice channel. A T1 receiver 216 converts line coded signals to transistor-transistor logic (TTL) and clock signals, and provides the TTL and clock signals to a T1 framer 218. The T1 framer separates the payload, or information bit stream, from the overhead, or carrier frequency signal, and divides the payload into data frames, each data frame being composed of time slots, or data packets, relating to separate DS0 channels. The T1 framer delivers the T1 payload to a rate multiplexer 220. The rate multiplexer accumulates time slots relating to a discrete DS0 channel, or channels, and composes the time slots to create a DS0 channel.

Instructions from the memory card and the keypad are interpreted by the microprocessor to control the operation and output of the rate multiplexer. The composed DS0 channel from the rate multiplexer may be directed to a test pattern receiver 222, a digital signal processor 224, or a pulse code modulator coder/decoder 226. The test pattern receiver evaluates test patterns that may be present on the DS0 channel and provides the test results to the microprocessor for interpretation and display according to instructions from the memory card. The digital signal processor manipulates the digital signal on the DS0 channel according to control instructions from a ROM 228 based on a RAM 230. RAM based ROM 228 is programmed according to instructions downloaded from the microprocessor and the memory card. The digital signal processor utilizes RAM 230 during calculation operations and for storage of signals and products of signal processing.

The rate multiplexer may also direct the DS0 signal to the pulse code modulator coder/decoder. The pulse code modulator coder/decoder converts the digital DS0 signal to an analog signal, such as a voice signal. This voice signal may be expressed on a speaker 18.

Conversely, an operator may speak into a microphone 20 to use the tester as a telephone. The pulse code modulator coder/decoder converts the analog voice signal to a digital DS0 signal. This signal may be processed by the digital signal processor, as described above, and the rate multiplexer may separate the single DS0 channel into time slots. The rate multiplexer may broadcast these time slots onto selected multiple DS0 channels to be framed by the T1 framer into a DS1 payload. A T1 transmitter 232 combines the DS1 payload with a T1 overhead to create a T1 channel that is provided to a T1 transmit port 234.

A test pattern generator 236 may also originate signals to be multiplexed by the rate multiplexer onto selected DS0 channels. These test pattern signals may be broadcast onto selected single or multiple DS0 channels, including all channels, to be framed and transmitted as described above.

Signals present at a T3/STS-1 receiver port 238 are processed similarly as described above for signals present at T1 receiver port 214. A DS3 communication channel, or line code, operates at nominally 44.736 Mbps and may contain up to 28 DS1 channels. Each of those DS1 channels may contain up to 24 DS0 channels, so a single DS3 channel may contain up to 672 DS0 channels. An STS-1 is an electrical test port of an optical fiber communication line. The STS-1 test port operates at nominally 51 Mbps. A preferred embodiment of the invention uses internal array conversion to test an STS-1 port similarly to a DS3 line code. A T3/STS-1 receiver 240 converts line coded signals into TTL and clock signals, and provides the TTL and clock signals to a T3 framer 242. The T3 framer separates either a DS3 payload from a T3 overhead, or an STS-1 payload from an STS-1 overhead, and divides the payload into data frames, each data frame being composed of time slots relating to separate DS1 channels, and may further separate the time slots relating to separate DS1 channels into time slots relating to separate DS0 channels within that DS1 channel. The output of the T3 framer is typically T1 TTL and clock signals, with an optional T3 payload output being available. The rate multiplexer accumulates time slots relating to either a DS1 channel or a DS0 channel and composes those time slots to create that channel or channels. Test pattern receiver 222 may evaluate a DS1 channel similarly as described above for a DS0 channel.

Similar to the T1 signal path described above, test pattern generator 236 may originate signals to be multiplexed by the rate multiplexer onto selected STS-1, DS3, DS1, or DS0 channels. These test pattern signals may be broadcast onto selected single or multiple STS-1, DS3, DS1, or DS0 channels, including all channels, to the T3 framer to be transmitted by a T3/STS-1 transmitter 244 at a T3/STS-1 transmitter port 246.

Figure 3:
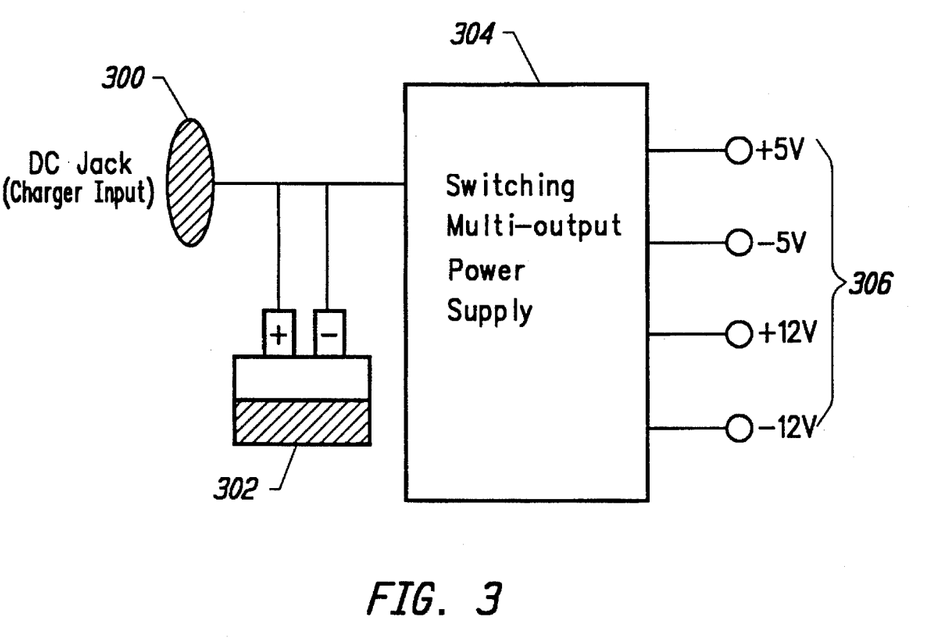
FIG. 3 is a block diagram of the battery power supply for the tester.

FIG. 3 shows a DC jack 300 to which a DC power supply (not shown) may be connected. The tester may operate off of a DC power supply, but in the preferred embodiment operates off of an integral rechargeable battery 302. A switching multiple-output power supply 304 converts power from the battery or the DC power supply to various voltages required for the tester. Voltage output terminals 306 supply the tester with the necessary power.

Figure 4A:
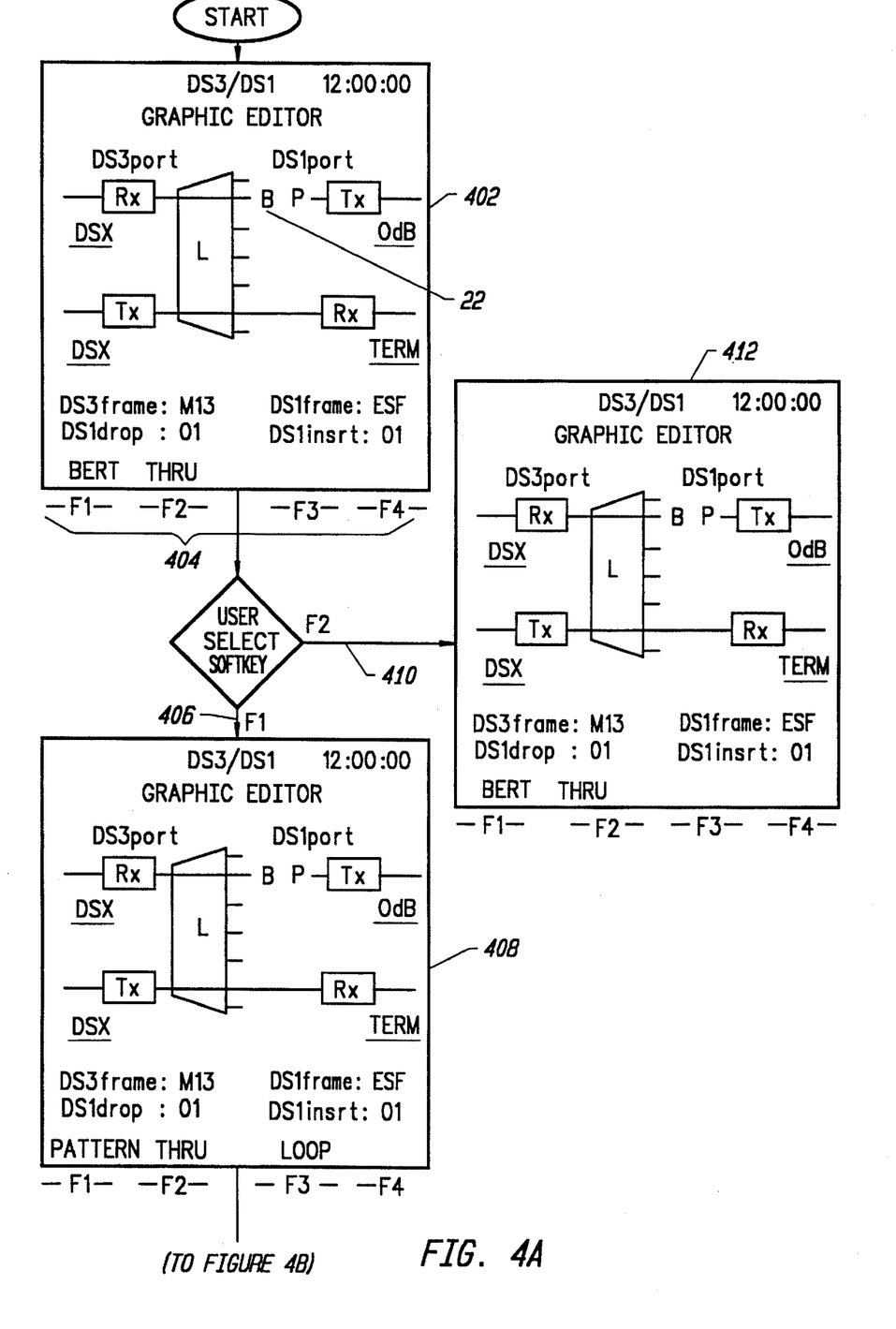
FIG. 4A through 4D are flow charts of the operation of the graphical configuration process.

FIGS. 4A through 4D are flowcharts illustrating the operation of the graphical editor. In FIG. 4a, an initial graphical display screen 402 shows the configuration of the tester on LCD graphical display 14 with a combination of text and graphic information. The user selects the tester connections and test states from function keys 404. The operation of the function keys is determined by the position of graphical pointer 22, represented by an inverse video rectangle. The position of the graphical pointer may be controlled with the arrow keys on the keypad, or, the pointer will automatically move when a function key is used to select a tester operation. If a function key is used to select a tester operation, the pointer will move to the same position on the LCD display as if the down arrow key had been pressed. If an arrow key is used to move the pointer, the function keys are automatically reprogrammed but the tester setup is not changed until a function key is selected.

Only those softkey functions relevant to the present position of the graphical pointer are presented to be selected by the user. In the instance of the graphical pointer position in 402, only "BERT" (F1) and "THRU" (F2) are presented. Additionally, the graphical presentation of the test system diagram's DS1 section disappears if you are only doing DS3 testing. Likewise, the graphical presentation of the test system diagram's DS3 section disappears if you are only doing DS1 testing. This not only allows the user to see how the tester is being directed out the DS1 and DS3 ports, it also automatically edits the tester functions to those which are appropriate for the chosen configuration. This simplifies test set up and reduces the chance of error due to misconfiguration.

If the user selects "BERT" (F1) 406 from 404, the tester configures a bit error rate test at the present pointer location. The pointer automatically moves to the next position as if the down arrow had been pressed, in this case the position shown in 408. Additionally, the function keys are automatically reprogrammed to reflect relevant choices from the new pointer position. If the user had selected "THRU" (F2) (lower rate signal multiplexed or demultiplexed to the higher rate signal) 410 instead of F1, the tester would be configured as shown in 412.

Figure 4B:
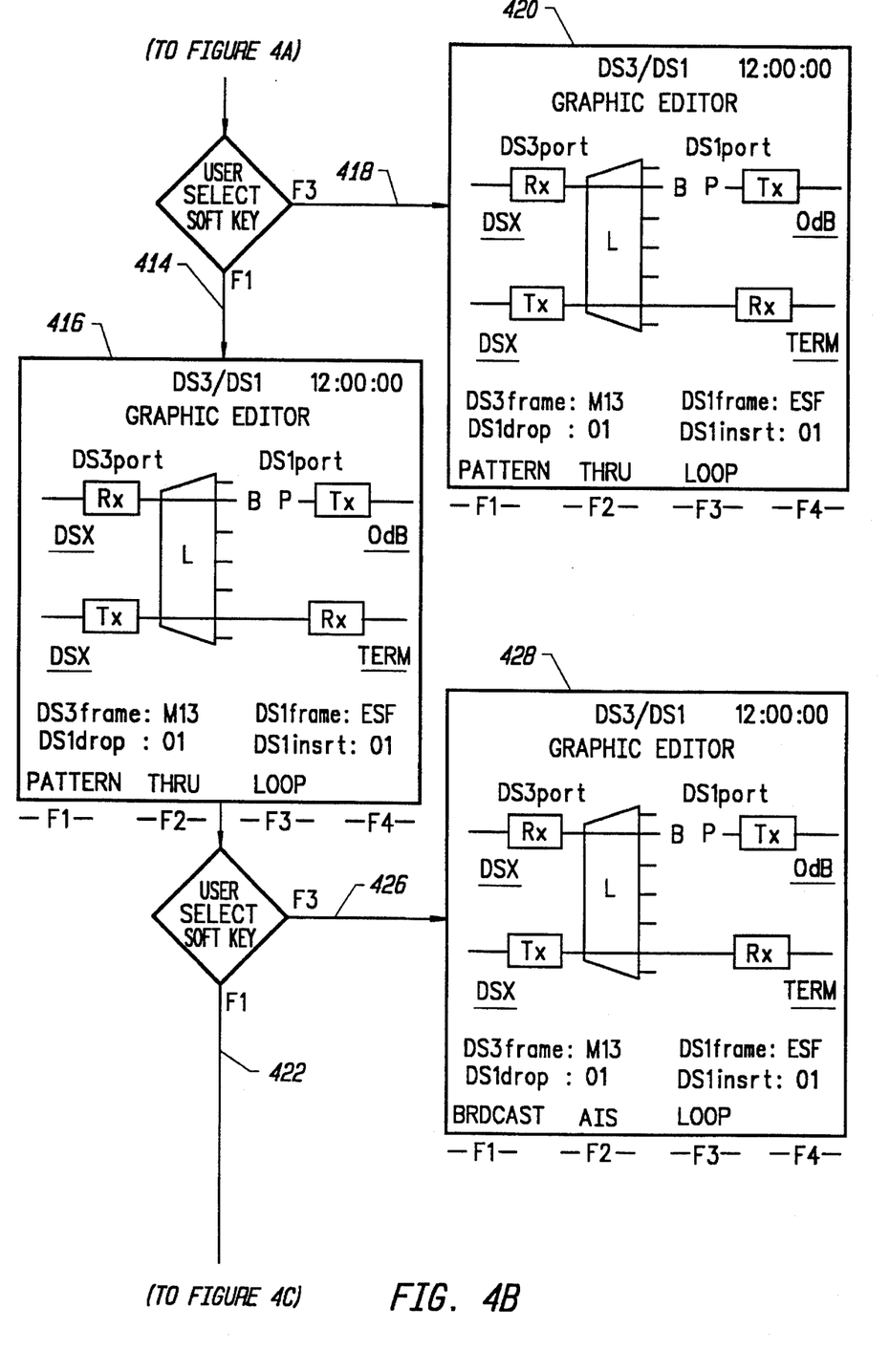

Continuing from 408, the user may select "PATTERN" (F1) (test pattern generator), "THRU" (F2), or "LOOP" (F3) (received signal is routed directly to the transmitter of the same rate). Selecting "PATTERN" (F1) 414 configures the tester as shown in 416. Selecting "LOOP" (F3) 418 would configure the tester as shown in 420. Continuing from 416, the user may select "PATTERN" (F1), "THRU" (F2), or "LOOP" (F3). Selecting "PATTERN" (F1) 422 configures the tester as shown in 424, and moves the pointer into the field on the display representing the multiplexer. The function keys are automatically reprogrammed to represent multiplexer functions. Selecting "LOOP" (F3) 426 would configure the tester as shown in 428.

Figure 4C:
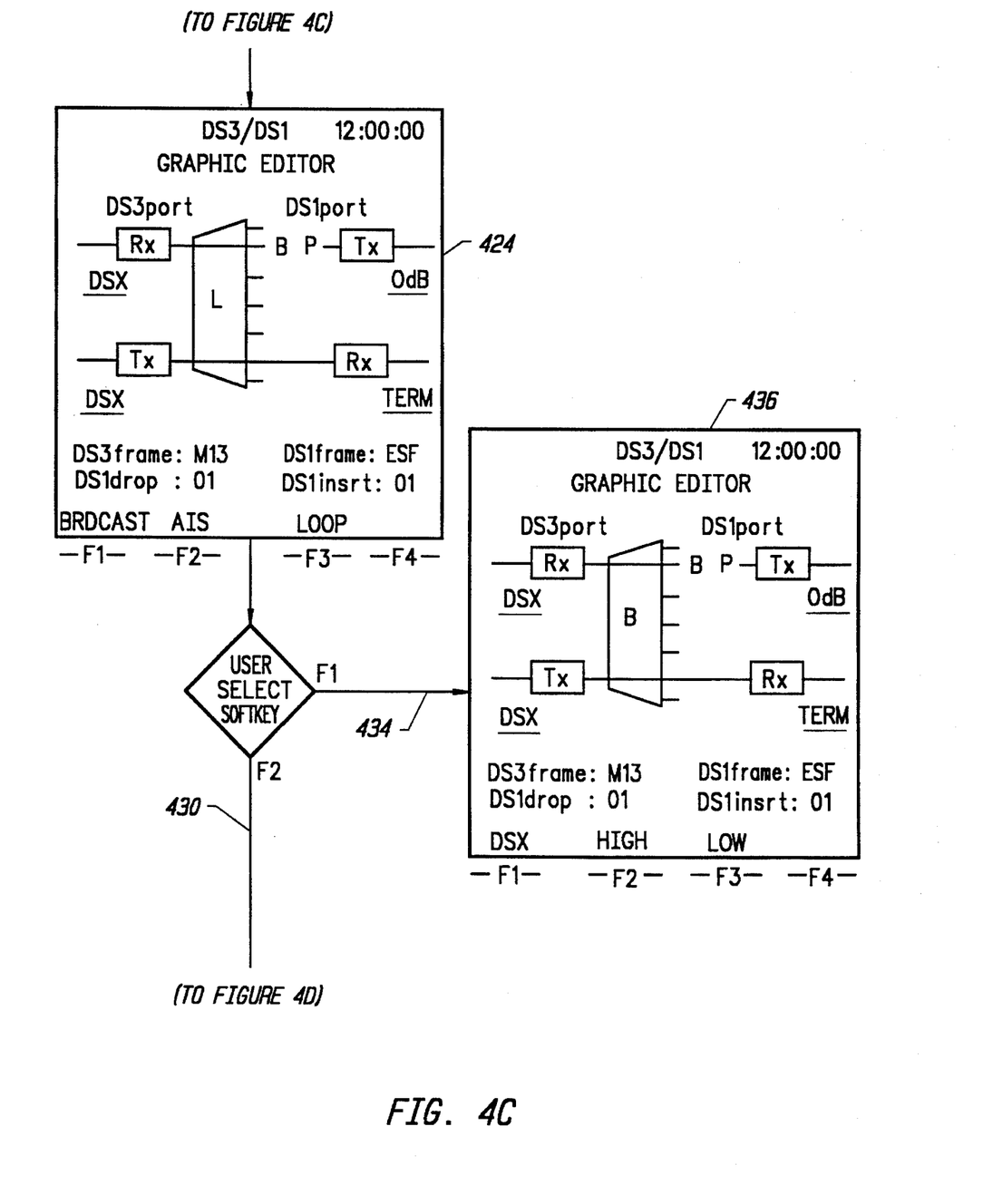
Figure 4D:
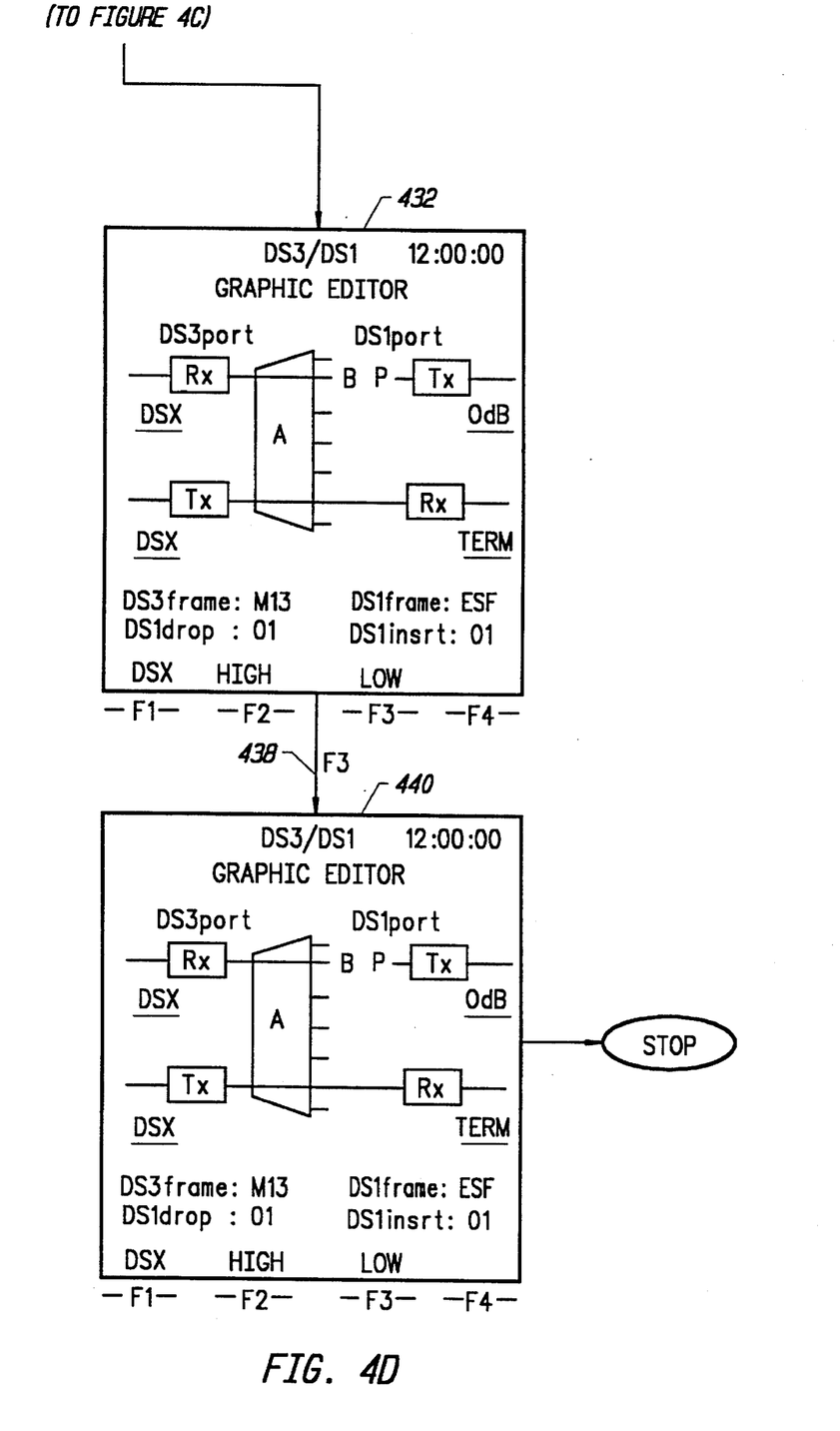

Continuing from 424, the user may select "BRDCAST" (F1) (a signal pattern to be broadcast multiplexed into the unselected DS1 channels within the DS3 bit stream), "AIS" (F2) (an all ones DS1 signal to be multiplexed into the unselected DS1 channels within the DS3 bit stream), or "LOOP" (F3). Selecting "AIS" (F2) 430 configures the tester as shown in 432. Selecting "LOOP" (F3) 434 would configure the tester as shown in 436. Continuing from 432, the user may select "DSX" (F1) (DS cross connect), "HIGH" (F2), or "LOW" (F3). Selecting "LOW" (F3) 438 configures the tester as shown in 440. Continuing from 440, the user may select "DSX" (F1), "HIGH" (F2), or "LOW" (F3), etc.

The preceding are examples of how the graphical editor works is not intended to limit the functions addressed in the graphical editor. The tester has several hundred possibilities of signal paths and test configurations. The graphical editor quickly configures any test set-up possible for the tester. Additionally, the graphical editor concurrently displays the test configuration and conditions as they are being entered. This minimizes the chance of performing an invalid test due to misconfiguration because the operator may check the test configuration on the display. Although the user input device has been described as including function and arrow keys, other user input devices may be utilized.

In conclusion, the present invention offers several advantages over existing telecommunication testers. While the above is a complete description of the preferred embodiments of the invention, various alternatives, modifications, and equivalents may be used. For example, the tester does not have to be hand held to realize the benefits of graphical editing. It is therefore intended that the following claims be interpreted broadly to cover all such alterations, modifications and alternative embodiments as fall within the true spirit and scope of the invention.

What is claimed is:

1. A device for testing communication transmission networks comprising:

at least one signal input port;

test circuitry which receive signals from said signal input port;

a multiplexer which routes said signals to said test circuitry;

a microprocessor that controls operation of said multiplexer and test circuitry;

a user input device for inputting operating instructions to said microprocessor, said operating instructions including a configuration of a communication transmission network; and a graphical display showing said configuration as said configuration is being input;

wherein graphical editing of said configuration of said communication transmission network is achieved.

2. The device in claim 1 further comprising a memory that stores said operating instructions.

3. The device in claim 1 wherein said test circuitry includes a test pattern generator and a test pattern receiver.

4. The device in claim 1 wherein the graphical display provides for graphical editing of said configuration by use of said user input device which is integral with said device.

5. The device in claim 1 wherein the device weighs less than five pounds.

6. The device in claim 5 wherein the device weighs 2.8 pounds.

7. The device in claim 1 wherein the device is battery powered.

8. The device in claim 1 wherein said communication transmission networks are digital communications lines.

9. A method for graphically editing configurations of communication transmission networks comprising the steps of:

displaying a configuration of a communication transmission network on a graphical display;

inputting a change to said configuration, said change being displayed on said graphical display; and updating said configuration according to said change;

wherein said configuration is displayed as said configuration is being changed; and wherein said change is input through a function key and operation of said function key is defined by a position of a graphical pointer on said graphical display.

10. A method for graphically editing configurations of communication transmission networks comprising the steps of:

displaying a configuration of a communication transmission network on a graphical display;

inputting a change to said configuration, said change being displayed on said graphical display;

updating said configuration according to said change, wherein said configuration is displayed as said configuration is being changed;

receiving a communication signal from said communication transmission network;

testing said communication signal according to said configuration;

displaying results of said testing on said graphical display; and demultiplexing a lower frequency channel from said communication signal.

11. The method of claim 10 wherein said communication signal is STS-1 or DS3.

12. A hand-held device for testing communication transmission networks comprising:

first signal input and output ports;

second signal input and output ports, said second input and output ports carrying signals at a lower frequency than said first input and output ports;

test circuitry which receive signals from said first and second signal input ports;

a multiplexer which routes said signals to said test circuitry;

a microprocessor that controls operation of said multiplexer and test circuitry;

a user input device for inputting operating instructions to said microprocessor, said operating instructions including a configuration of a communication transmission network; and a graphical display showing said configuration of said communication transmission network.

13. The device in claim 12 further comprising a memory that stores said operating instructions.

14. The device in claim 12 wherein said test circuitry includes a test pattern generator and a test pattern receiver.

15. The device in claim 12 wherein said graphical display shows said configuration as said configuration is being input wherein graphical editing of said configuration of said communication transmission network is achieved.

16. The device in claim 12 wherein the device weighs less than five pounds.

17. The device in claim 16 wherein the device weighs 2.8 pounds.

18. The device in claim 12 wherein the device is battery powered.

19. The device in claim 12 wherein said communication transmission networks are digital communications lines.

20. A hand-held device for testing communication transmission networks comprising:

at least one STS-1 signal input port;

a plurality of test circuits which receive signals from said signal input port;

a multiplexer which separates a plurality of lower frequency signals from a higher frequency signal and which routes said signals to said test circuits;

a microprocessor that controls operation of said multiplexer and test circuits;

a user input device for inputting operating instructions to said microprocessor, said operating instructions including a configuration of a communication transmission network; and a graphical display showing said configuration as said configuration is being input;

wherein said device operates from battery power and weighs less than five pounds providing a hand-held device which allows graphical editing of said configuration of said communication transmission network.

* * * * *